Patented Jan. 15, 1935

1,987,980

UNITED STATES PATENT OFFICE 1,987,980

LACQUER

Carl W. Sweitzer, Pittsburgh, Pa., assignor to Columbian Carbon Company, New York, N. Y., a corporation of Delaware, and Binney & Smith Company, New York, N. Y., a corporation of New Jersey No Drawing. Application January 10, 1933
Serial No. 651,057

13 Claims. (Cl. 134—79)

This invention relates to lacquers, and consists in a black lacquer of superior character and quality, and in the method of its preparation. This application is a continuation in part of an application for Letters Patent of the United States filed by me July 29, 1931, Serial No. 553,881.

Black lacquers are now largely used upon sheet steel and other materials, chiefly metals, as the surface finish of automobile bodies and of attached parts.

These are the properties peculiar to a black lacquer which the lacquer manufacturer desires: (1) maximum blackness; (2) permanence of color: that is to say, no fading under service conditions; (3) a definitely black tone or cast, rather than the brownish tone or cast often observed in black lacquers; (4) maximum dispersion of the pigment; and (5) maximum covering power.

Carbon black is an article of commerce; it is a soft, fluffy, extremely finely divided form of carbon, produced by the incomplete combustion of natural gas. In the manufacture of black lacquer with carbon black, the pigment is ground with the body material (nitrocellulose may be taken as a typical body material); and heretofore it has been a problem, how to obtain complete, or, at least, adequate, dispersion of the particles of carbon black in the body material. Because of inadequate dispersion, these lacquers tend to assume a brownish tone or cast, and the full intensity of color is not developed.

Since it heretofore has not been possible to produce black lacquer of desired excellence with carbon black alone as a pigment, resort has been had to soluble dyes and partly soluble toners. In some instances these dyes and toners have been used as the only pigments; and in other cases dyes and toners of bluish cast have been introduced with carbon black into the lacquer, and in such association they have had the effects of intensifying slightly the black color, and improving to some extent the tone. But whether used in one way or the other, these dyes and toners are not satisfactory nor adequate. Unlike carbon black, their color is not permanent; they fade. Whether used alone as pigment, or in association with carbon black, the consequence and effect of fading are very bad.

This invention is found in a substantially perfect and permanent dispersion of the particles of carbon black in the body of the lacquer, constituting a true dispersoid or colloid; and this is accomplished by grinding together and mixing with the body material of the lacquer the carbon black and a suitable dispersing agent. I have found that by employing as a dispersing agent a copper salt, and, preferably, a copper soap; that is to say, a copper salt of a fatty acid—stearic, oleic, resinic, and linoleic;—and by grinding in a suitable mill and under suitable conditions, I am able to attain complete and ultimate dispersion of the carbon black and to produce a true dispersoid or colloid. This has not heretofore been achieved. In consequence, my invention affords a black lacquer of such depth of tone, of such permanence, and of such adaptability in use, as has not hitherto been achieved. Specifically, I find that, among copper soaps, copper oleate, a dry powder, is the most available and is wholly satisfactory. Copper salts generally are valuable in aiding and effecting a substantially complete dispersion of carbon black in the body of the lacquer, and among the mineral acid salts of copper I name the nitrate and the chloride as particularly serviceable. But I have found the fatty acid salts superior and preferable. It will be remarked of the copper salts here named,—copper oleate, stearate, resinate, and linoleate, copper nitrate, and copper chloride—that they all are soluble in such body material as has been mentioned (nitrocellulose); and it is essential to the practice of the method and attainment of the result that such solution occur.

The grinding of the lacquer of my invention is accomplished under pressure, in a mill of one or another of the various types in which grinding under pressure may be performed. The mill known as the Banbury mixer, in which oppositely moving rollers act simultaneously upon the charge, has the effect of grinding under pressure. Preferably, I employ a roller mill, such as that commonly employed in the compounding of rubber for industrial purposes. The mill consists, essentially, of two closely spaced, parallel rollers, between which, when the mill is in operation, a difference in surface speed is maintained.

The proportions of the ingredients introduced into the mill will be such, and the conditions (temperature, particularly) such, that at the beginning of the grinding operation the material is soft and plastic. This condition of softness and plasticity may, as has just been intimated, with materials ordinarily employed, be brought about by or intensified by heating. Alternatively, or in a supplementary way, or even as the major softening means, some suitable volatile liquid may be introduced with the permanent ingredients into the mill. Such a liquid, so serving its purpose, will as the milling operation progresses evaporate. In any case, milling conditions being properly controlled, the mass at length is brought, in dry condition, to the point of brittleness.

A typical mill charge is the following:

I

| | Parts |
|---|---|
| ½ sec. nitrocellulose (30% alcohol) | 143 |
| Resin | 25 |
| Plasticizer | 50 |
| Carbon black | 17 |
| Copper oleate | 1.7 |
| Solvent | 20 |

The plasticizer may be such as the art knows; castor oil, for example, dibutyl phthalate, or tricresyl phosphate; and the solvent may be such as the art recognizes to be suitable; butyl acetate, for example, amyl acetate, or ethyl acetate.

The action of the mill in grinding the charge is essentially the mechanical one of intimate and thorough mixing, and the effect of the metallic soap is a substantially complete and intimate and permanent dispersion of the particles of carbon black through the mass. Grinding is continued until mixing is complete, and, in consequence of evaporation or cooling or both, the mass comes to the point of brittleness and dryness. As the grinding progresses (in the roller mill) and the mass stiffens, the rolls are tightened and the temperature is raised to about 60° C. At the end of the grinding operation the mass is peeled from the rolls in the form of a shiny-surfaced sheet. When cold it is hard and brittle, and is then broken to the form of chips.

This is a complete lacquer and can be prepared for use by the addition to it of a suitable known solvent. For example, to 23 grams of the product above described 77 grams of a solvent of the following formula may be added:

| | Parts |
|---|---|
| Toluol | 50 |
| Butyl acetate | 25 |
| Ethyl acetate | 15 |
| Butyl alcohol | 10 |

It will be understood that when the mass is freshly ground the solvent may immediately be added; but, as a matter of convenience in manufacture, sale, and use, the product of the mill is ordinarily reduced to chip form, and so marketed. It then is by the purchaser prepared for use when needed.

As a minor variation upon the procedure described above, the carbon black, the plasticizer, and the dispersing agent may preliminarily be mingled together in heated condition, at a temperature of about 150° C. The result of this preliminary step will be a fairly dry, crumbly mass, and this may be introduced with the other ingredients into the mill.

Other formulæ for the mill charge may be:

II

| | Parts |
|---|---|
| ½ sec. nitrocellulose (30% alcohol) | 143 |
| Plasticizer | 30 |
| Carbon black | 20 |
| Copper oleate | 2 |
| Solvent | 20 |

III

| | Parts |
|---|---|
| ½ sec. nitrocotton (30% alcohol) | 143 |
| Carbon black | 17 |
| Copper oleate | 1.7 |
| Solvent | 25 |

IV

| | Parts |
|---|---|
| Resin | 150 |
| Plasticizer | 40 |
| Carbon black | 25 |
| Copper oleate | 2.5 |
| Solvent | 50 |

Of these, Formula II admits of greater freedom in preparation of a complete lacquer than does Formula I. Resin, for instance, may be added during preparation for use, thus increasing the bulk of the body material; likewise the quantity of plasticizer may be increased; Formula III admits of still greater freedom of variation of the nature indicated; while Formula IV is useful in the newer type of straight resin lacquers.

The body material may, as the formulæ indicate, be nitrocellulose, or resin, or a mixture of the two. The formulæ given are not to be understood to be exhaustive, but simply typical; one who practices the art will understand that wide variation in composition is permissible. The essential constituents for a black lacquer are a lacquer body, carbon black as a pigment, and a copper soap as a dispersing agent; and the practice of the invention involves the creation of a true dispersoid or colloid. This is accomplished by grinding the constituents in a pressure mill.

By repeated test I have demonstrated that, in the practice of my method upon my materials, I do indeed produce a true colloid, and that a true colloid cannot otherwise be produced. I have found that if I subject my materials to the operation of a pebble mill (a usual procedure in the industry) the resulting lacquer will be inferior; and if instead of a copper soap I use another dispersing agent, even though in all other respects I follow the method of my invention, the result will be inferior. On the other hand, I have found that, in association with pigments of finely divided solid nature other than carbon black, grinding, in association with a copper soap, will afford superior results.

The fact that I obtain ultimate dispersion and produce a true colloid is abundantly demonstrated; generally, in the superiority of the resulting product; and, specifically, in certain tests: (1) There is no more than a negligible gravitational separation of the pigment, whatever be the degree of dilution of the lacquer and whatever the length of time during which the dissolved lacquer is left standing. (2) If a pigmented lacquer be diluted and dropped on a filter paper the filter paper will tend to hold back the pigment but permit the liquid to spread until such spread is eventually stopped, as determined by evaporation and the amount of the solvent. In such a test a clear space will show between the limit of spread of liquid and the pigment, the size of clear space depending on the degree of dispersion of the pigment. The pigment of my lacquer will in such test follow the liquid practically to the limit of its spread; whereas other black lacquers in comparison show the pigment to be so held back that a very marked clear ring is shown between liquid and pigment spread. (3) Under the ordinary microscope it is not possible to resolve clearly the dispersion of my lacquer and to reveal discreet dispersed particles, even at the high magnification of 1000 diameters. No other black lacquer known to me can endure this test. (4) My lacquer diluted and observed under any well-known ultra-microscopic set-up reveals the phenomenon of the Brownian movement, characteristic of true colloids. No other carbon-black lacquer known to me has endured this test.

It is my present opinion (though I do not intend nor desire to be bound by theory) that, when the dispersing agent comes into solution in the body material, the copper ion is serviceable to promote dispersion, while the fatty-acid radical (if such radical be present) facilitates grinding. Indeed, if the copper be introduced in the form of a mineral salt—the nitrate, for example, or the chloride—it will be found that a further addition of a soluble soap—sodium oleate, for example—will facilitate the grinding.

I claim as my invention:

1. The method herein described of forming a black lacquer which consists in grinding together under pressure a lacquer body including one or both of the constituents nitrocellulose and resin, carbon black, and a copper salt soluble in the mill charge, together with a volatile solvent for the lacquer, and prolonging the grinding until by evaporation the mass is brought to dryness, and until a complete dispersion in colloidal condition of the carbon black in the lacquer body is attained.

2. A dry lacquer stock adapted by solution to be brought to condition for use and consisting of a nitrocellulose-containing body within which, in association with copper oleate, a quantity of carbon black is present in a condition of colloidal dispersion.

3. A lacquer consisting of a nitrocellulose-containing body within which, in association with a copper soap soluble in such body, a quantity of carbon black is present in a condition of colloidal dispersion.

4. A lacquer consisting of a nitrocellulose-containing body, within which, in association with copper oleate, a quantity of carbon black is present in a condition of colloidal dispersion.

5. A dry lacquer stock adapted to be brought by solution to condition for use and consisting of a lacquer body including one or both of the constituents nitrocellulose and resin within which, in association with copper oleate, a quantity of carbon black is dispersed, present in a condition of colloidal dispersion.

6. A dry lacquer stock adapted to be brought by solution to condition for use, and consisting of a nitrocellulose-containing body within which, in association with a copper soap soluble in such body, a quantity of carbon black is present in a condition of colloidal dispersion.

7. A dry lacquer stock adapted to be brought by solution to condition for use, and consisting of a nitrocellulose-containing body within which, in association with a copper salt of a fatty acid soluble in such body, a quantity of carbon black is present in a condition of colloidal dispersion, the dispersion being of such completeness and intimacy that under magnification of one thousand diameters no visible resolution into discrete particles may be found.

8. The method herein described of forming a black lacquer which consists in grinding together under pressure a lacquer body including one or both of the constituents nitrocellulose and resin, carbon black, and a copper soap soluble in the lacquer body.

9. The method herein described of forming a black lacquer which consists in grinding together under pressure a lacquer body including one or both of the constituents nitrocellulose and resin, carbon black, and an addition in which copper is present in the form of a compound of an acid selected from a group consisting of fatty acids and inorganic acids, said compound being soluble in the mill charge.

10. The method herein described of forming a black lacquer which consists in grinding together under pressure a nitrocellulose-containing lacquer body, carbon black, and a copper soap soluble in the mill charge.

11. The method herein described of forming a black lacquer which consists in grinding together under pressure a nitrocellulose-containing lacquer body, carbon black, and copper oleate.

12. A dry lacquer stock adapted to be brought by solution to condition for use and consisting of a lacquer body including one or both of the constituents nitrocellulose and resin, within which body, in association with a copper compound of an acid selected from the group consisting of fatty acids and inorganic acids, said compound being soluble in such body, a quantity of carbon black is present in a condition of colloidal dispersion, the dispersion being of such completeness and intimacy that under magnification of one thousand diameters no resolution into discrete particles may be found.

13. As a marketable article a sheeted and flaked complete lacquer adapted by solution in a volatile carrier to be brought to condition for use, consisting of a lacquer body of either or both nitrocellulose and resin, and as a pigment carbon black in association with a copper salt soluble in the lacquer body.

CARL W. SWEITZER.